US012601808B2

(12) United States Patent
Wang et al.

(10) Patent No.:  US 12,601,808 B2
(45) Date of Patent:        Apr. 14, 2026

(54) BEAM ALIGNMENT METHOD AND RELATED DEVICE

(71) Applicant: Huawei Technologies Co., Ltd., Shenzhen (CN)

(72) Inventors: Shipeng Wang, Shanghai (CN); Xihe You, Shanghai (CN); Bao Zhang, Shanghai (CN)

(73) Assignee: HUAWEI TECHNOLOGIES CO., LTD., Shenzhen (CN)

( * ) Notice:   Subject to any disclaimer, the term of this patent is extended or adjusted under 35 U.S.C. 154(b) by 560 days.

(21) Appl. No.: 18/007,896

(22) PCT Filed:    May 27, 2021

(86) PCT No.:      PCT/CN2021/096453
    § 371 (c)(1),
    (2) Date:      Dec. 2, 2022

(87) PCT Pub. No.: WO2021/244398
    PCT Pub. Date: Dec. 9, 2021

(65)          Prior Publication Data
    US 2024/0230816 A1      Jul. 11, 2024

(30)      Foreign Application Priority Data
    Jun. 3, 2020    (CN) ......................... 202010497707.3

(51) Int. Cl.
    *G01S 3/00*         (2006.01)
    *G01S 3/06*         (2006.01)
    *H04B 7/0408*       (2017.01)
    *H04B 7/06*         (2006.01)
    *H04B 7/08*         (2006.01)

(52) U.S. Cl.
    CPC .............. *G01S 3/06* (2013.01); *H04B 7/0408* (2013.01); *H04B 7/0696* (2023.05); *H04B 7/088* (2013.01)

(58) Field of Classification Search
    CPC ....... G01S 3/06; H04B 7/0408; H04B 7/0696; H04B 7/088; H04B 7/0695; H04B 7/0617
    See application file for complete search history.

(56)          References Cited

U.S. PATENT DOCUMENTS

2015/0236779 A1*  8/2015  Jalali .................. H04B 7/18504
                                                342/367
2017/0330462 A1*  11/2017  Serrano .................. G08G 1/161
                    (Continued)

FOREIGN PATENT DOCUMENTS

EP          3416301 A1    12/2018

*Primary Examiner* — Md K Talukder
(74) *Attorney, Agent, or Firm* — Conley Rose, P.C.

(57)          ABSTRACT

A beam alignment method includes receiving, at a current location by using a plurality of receive beams, a transmit beam from a network device, and determining reference signal received power (RSRP) of each of the plurality of receive beams; selecting an optimal receive beam from the plurality of receive beams based on the RSRP; determining, based on the optimal receive beam, a rotation angle and a rotation direction for a terminal device to align a peak direction beam with the transmit beam; and adjusting a location of the terminal device based on the rotation angle and the rotation direction, and forming an optimal beam pair by using the peak direction beam and the transmit beam at an adjusted location.

20 Claims, 7 Drawing Sheets

(56)         References Cited

U.S. PATENT DOCUMENTS

| | | | |
|---|---|---|---|
| 2018/0302138 A1* | 10/2018 | Shirakata | G01S 3/02 |
| 2023/0039686 A1* | 2/2023 | Xu | H04W 48/16 |
| 2023/0101994 A1* | 3/2023 | Pezeshki | H04W 72/046 |
| | | | 370/329 |
| 2024/0230816 A1* | 7/2024 | Wang | H04B 7/0695 |
| 2024/0333362 A1* | 10/2024 | Hui | H04W 76/14 |

* cited by examiner

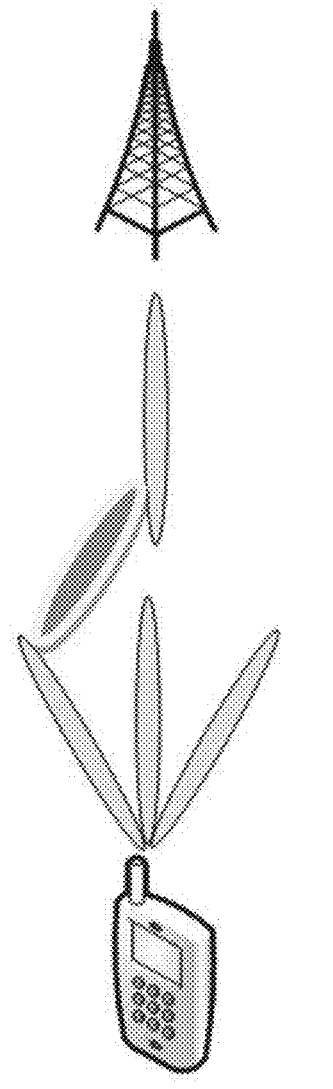
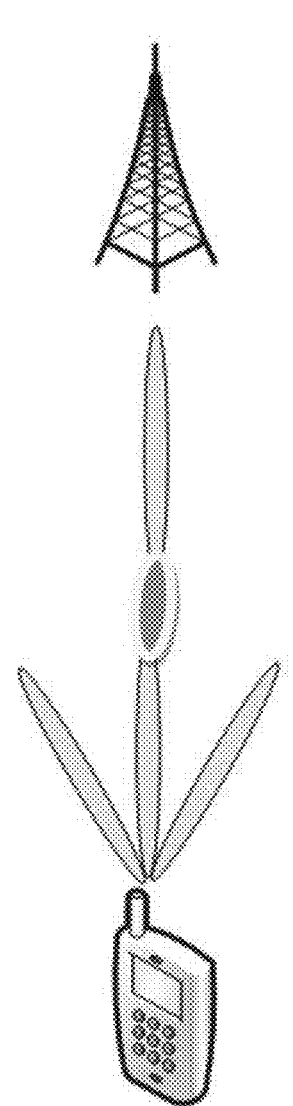
FIG. 2

Normalized array gain
Antenna beamforming direction
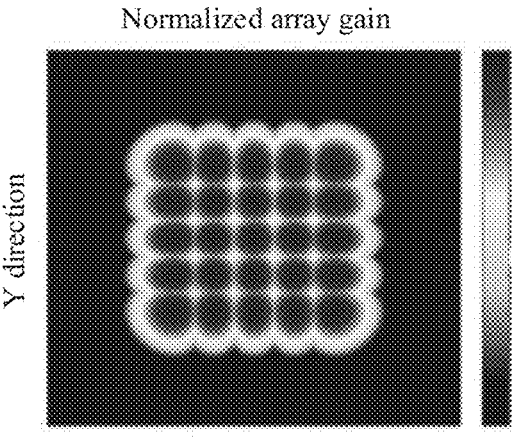
Y direction
X direction
FIG. 3(A)
Normalized array gain
Antenna beamforming direction
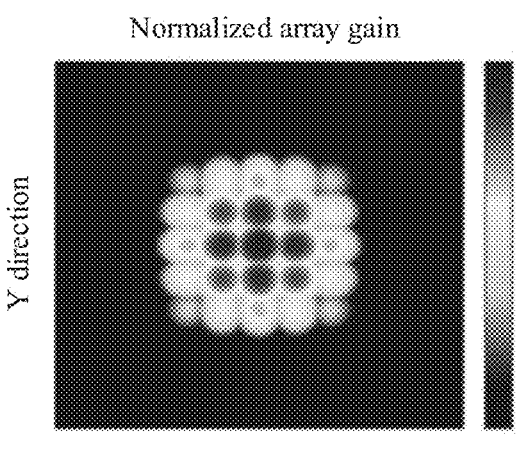
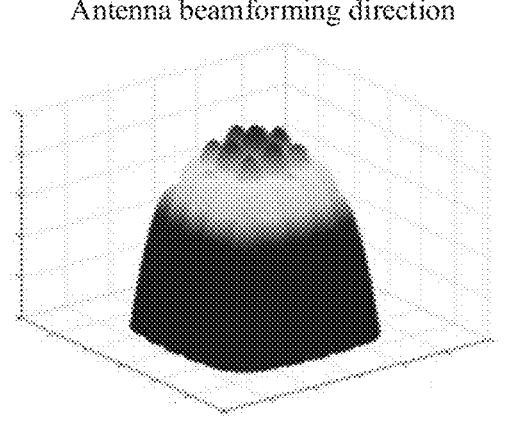
Y direction
X direction
FIG. 3(B)

| EIRP | Beam 0 | Beam 1 | Beam 2 | Beam 3 | Beam 4 |
|---|---|---|---|---|---|
| Beam 0 | 16.87 | 17.4 | 20.22 | 17.41 | 16.59 |
| Beam 1 | 17.2 | 19.33 | 21.19 | 18.79 | 18.08 |
| Beam 2 | 19.38 | 20.9 | 21.49 | 20.9 | 20.37 |
| Beam 3 | 17.63 | 19.11 | 21.4 | 18.94 | 18.61 |
| Beam 4 | 16.82 | 17.93 | 20.79 | 18.49 | 16.54 |

FIG. 3(C)

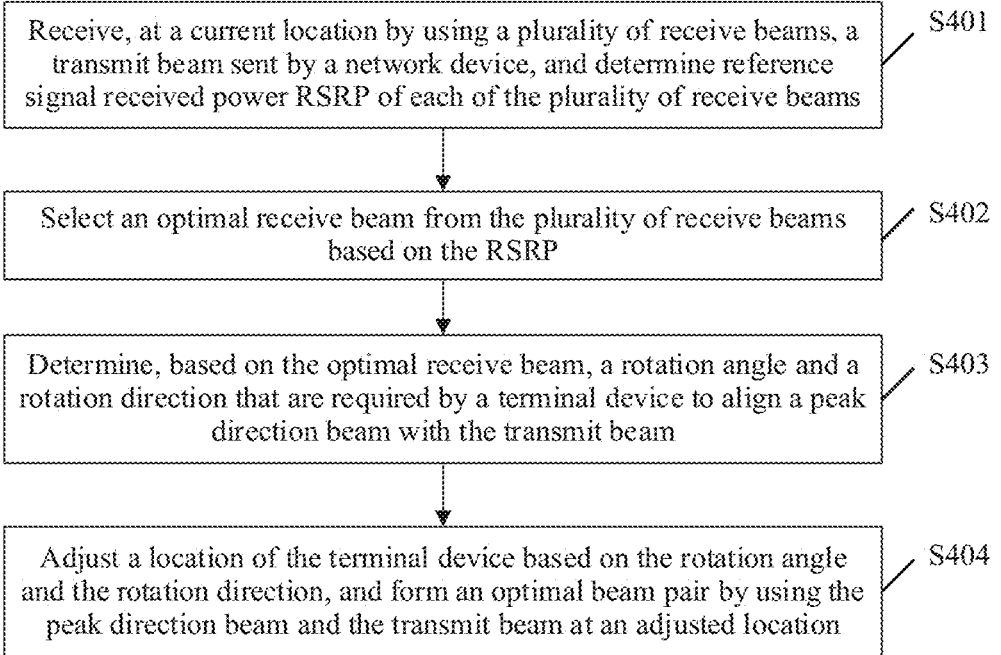

Receive, at a current location by using a plurality of receive beams, a transmit beam sent by a network device, and determine reference signal received power RSRP of each of the plurality of receive beams     S401

Select an optimal receive beam from the plurality of receive beams based on the RSRP     S402

Determine, based on the optimal receive beam, a rotation angle and a rotation direction that are required by a terminal device to align a peak direction beam with the transmit beam     S403

Adjust a location of the terminal device based on the rotation angle and the rotation direction, and form an optimal beam pair by using the peak direction beam and the transmit beam at an adjusted location     S404

BEAM ALIGNMENT METHOD AND RELATED DEVICE

CROSS-REFERENCE TO RELATED APPLICATIONS

This is a U.S. National Stage of International Patent Application No. PCT/CN2021/096453 filed on May 27, 2021, which claims priority to Chinese Patent Application No. 202010497707.3 filed on Jun. 3, 2020. Both of the aforementioned applications are hereby incorporated by reference in their entireties.

TECHNICAL FIELD

This application relates to the field of communications technologies, and in particular, to a beam alignment method and a related device.

BACKGROUND

A millimeter wave (millimeter wave, mmWave) is one of most potential technologies in promoting development of a 5th generation (5th generation, 5G) mobile communications technology. The millimeter wave has features of high bandwidth, a low latency, and an inexpensive spectrum, which can reduce costs for operators. Therefore, in 5G technology development, the mmWave can not only provide a higher data transmission rate, but also reduce transmission costs per bit. However, the mmWave has a short wavelength and a high frequency, has strong attenuation, and is susceptible to rain fade and atmospheric absorption. Therefore, alignment between a receive beam and a transmit beam cannot be ensured, and an optimal receive gain and an optimal transmit gain cannot be obtained.

SUMMARY

Embodiments of this application provide a beam alignment method and a related device, to increase a transmit gain or a receive gain of a terminal device, and improve coverage and mobility of a millimeter wave.

According to a first aspect, an embodiment of this application provides a beam alignment method, including: receiving, at a current location by using a plurality of receive beams, a transmit beam sent by a network device, and determining reference signal received power RSRP of each of the plurality of receive beams; selecting an optimal receive beam from the plurality of receive beams based on the RSRP; determining, based on the optimal receive beam, a rotation angle and a rotation direction that are required by a terminal device to align a peak direction beam with the transmit beam; and adjusting a location of the terminal device based on the rotation angle and the rotation direction, and forming an optimal beam pair by using the peak direction beam and the transmit beam at an adjusted location. The rotation angle and the rotation direction that are required for rotating from a location of the peak direction beam to a location of the optimal receive beam are determined, so that after adjusting the location, the terminal device can form an optimal beam pair by using the peak direction beam and the transmit beam. This not only increases a transmit gain or a receive gain of the terminal device, but also improves coverage and mobility of a millimeter wave.

In a possible design, after the rotation angle and the rotation direction that are required by the terminal device to align the peak direction beam with the transmit beam are determined, the rotation angle and the rotation direction are displayed. Therefore, a user can adjust the location of the terminal device based on the displayed rotation angle and rotation direction, and the operation is convenient and quick.

In another possible design, when the terminal device is adjusted to a location indicated by the rotation angle and the rotation direction, prompt information is displayed. The prompt information is used to prompt the user that adjustment of the location of the terminal device is completed. Therefore, when viewing the prompt information, the user can stop rotating the location of the terminal device, to improve accuracy of adjusting the location.

In another possible design, the terminal device may select, from the plurality of receive beams, a receive beam with highest RSRP as the optimal receive beam. The receive beam with highest RSRP is selected as the optimal receive beam, and the rotation angle and the rotation direction that are required for rotating from the location of the peak direction beam to the location of the optimal receive beam are determined, so that the transmit gain or the receive gain of the terminal device is increased to an optimal effect.

In another possible design, the terminal device may determine a relative location of the peak direction beam and the optimal receive beam; and determine, based on the relative location, the rotation angle and the rotation direction that are required by the terminal device to align the peak direction beam with the transmit beam. The rotation angle and the rotation direction that are required for rotating from the location of the peak direction beam to the location of the optimal receive beam are determined by using the relative location of the peak direction beam and the optimal receive beam, to improve accuracy of determining the rotation angle and the rotation direction.

In another possible design, the peak direction beam is a beam perpendicular to an antenna panel of the network device.

According to a second aspect, an embodiment of this application provides a terminal device. The terminal device includes a modem, a processor, and a display. The modem is configured to: receive, at a current location by using a plurality of receive beams, a transmit beam sent by a network device, determine reference signal received power RSRP of each of the plurality of receive beams, select an optimal receive beam from the plurality of receive beams based on the RSRP, and send the optimal receive beam to the processor. The processor is configured to: receive the optimal receive beam, determine a rotation angle and a rotation direction that are required by the terminal device to align a peak direction beam with the transmit beam, adjust a location of the terminal device based on the rotation angle and the rotation direction, and form an optimal beam pair by using the peak direction beam and the transmit beam at an adjusted location. The rotation angle and the rotation direction that are required for rotating from a location of the peak direction beam to a location of the optimal receive beam are determined, so that after adjusting the location, the terminal device can form an optimal beam pair by using the peak direction beam and the transmit beam. This not only increases a transmit gain or a receive gain of the terminal device, but also improves coverage and mobility of a millimeter wave.

In another possible design, the display is configured to display the rotation angle and the rotation direction. Therefore, a user can adjust the location of the terminal device based on the displayed rotation angle and rotation direction, and the operation is convenient and quick.

In another possible design, the display is further configured to: display prompt information when the terminal device is adjusted to a location indicated by the rotation angle and the rotation direction. The prompt information is used to prompt the user that adjustment of the location of the terminal device is completed. Therefore, when viewing the prompt information, the user can stop rotating the location of the terminal device, to improve accuracy of adjusting the location.

In another possible design, the modem is further configured to select, from the plurality of receive beams, a receive beam with highest RSRP as the optimal receive beam. The receive beam with highest RSRP is selected as the optimal receive beam, and the rotation angle and the rotation direction that are required for rotating from the location of the peak direction beam to the location of the optimal receive beam are determined, so that the transmit gain or the receive gain of the terminal device is increased to an optimal effect.

In another possible design, the processor is further configured to: determine a relative location of the peak direction beam and the optimal receive beam, and determine, based on the relative location, the rotation angle and the rotation direction that are required by the terminal device to align the peak direction beam with the transmit beam. The rotation angle and the rotation direction that are required for rotating from the location of the peak direction beam to the location of the optimal receive beam are determined by using the relative location of the peak direction beam and the optimal receive beam, to improve accuracy of determining the rotation angle and the rotation direction.

According to a third aspect, an embodiment of this application provides a beam alignment apparatus. The beam alignment apparatus is configured to implement the method and the function performed by the terminal device in the foregoing first aspect, and is implemented by hardware/ software, and the hardware/software includes a module corresponding to the foregoing function.

According to a fourth aspect, an embodiment of this application provides a terminal device. The terminal device includes a processor, a memory, and a communication bus. The communication bus is configured to implement connection and communication between the processor and the memory, and the processor executes a program stored in the memory, to implement the steps in the first aspect.

According to a fifth aspect, an embodiment of this application provides a computer-readable storage medium. The computer-readable storage medium stores instructions, and when the instructions are run on a computer, the computer is enabled to perform the methods according to the foregoing aspects.

According to a sixth aspect, an embodiment of this application provides a computer program product including instructions. When the computer program product runs on a computer, the computer is enabled to perform the methods according to the foregoing aspects.

According to a seventh aspect, an embodiment of this application provides a chip. The chip includes a processor, configured to: invoke instructions from a memory and run the instructions stored in the memory, so that a device in which the chip is installed performs the method according to any one of the foregoing aspects.

According to an eighth aspect, an embodiment of this application provides another chip. The chip includes an input interface, an output interface, and a processor. Optionally, the chip further includes a memory. The input interface, the output interface, the processor, and the memory are connected through an internal connection path. The processor is configured to execute code in the memory. When the code is executed, the processor is configured to perform the method according to any one of the foregoing aspects.

BRIEF DESCRIPTION OF DRAWINGS

To describe the technical solutions in embodiments of this application or in the background more clearly, the following describes the accompanying drawings for describing embodiments of this application or the background.

FIG. 2 is a schematic diagram of beam alignment according to an embodiment of this application;

FIG. 3(A) is a top view and a side view of an antenna array factor gain according to an embodiment of this application:

FIG. 3(B) is a top view and a side view of another antenna array factor gain according to an embodiment of this application:

FIG. 3(C) is a schematic diagram of an EIRP according to an embodiment of this application;

FIG. 4 is a schematic flowchart of a beam alignment method according to an embodiment of this application;

FIG. 6 is a schematic diagram of a beam according to an embodiment of this application:

DESCRIPTION OF EMBODIMENTS

The following describes embodiments of this application with reference to the accompanying drawings in embodiments of this application.

Figure 1:
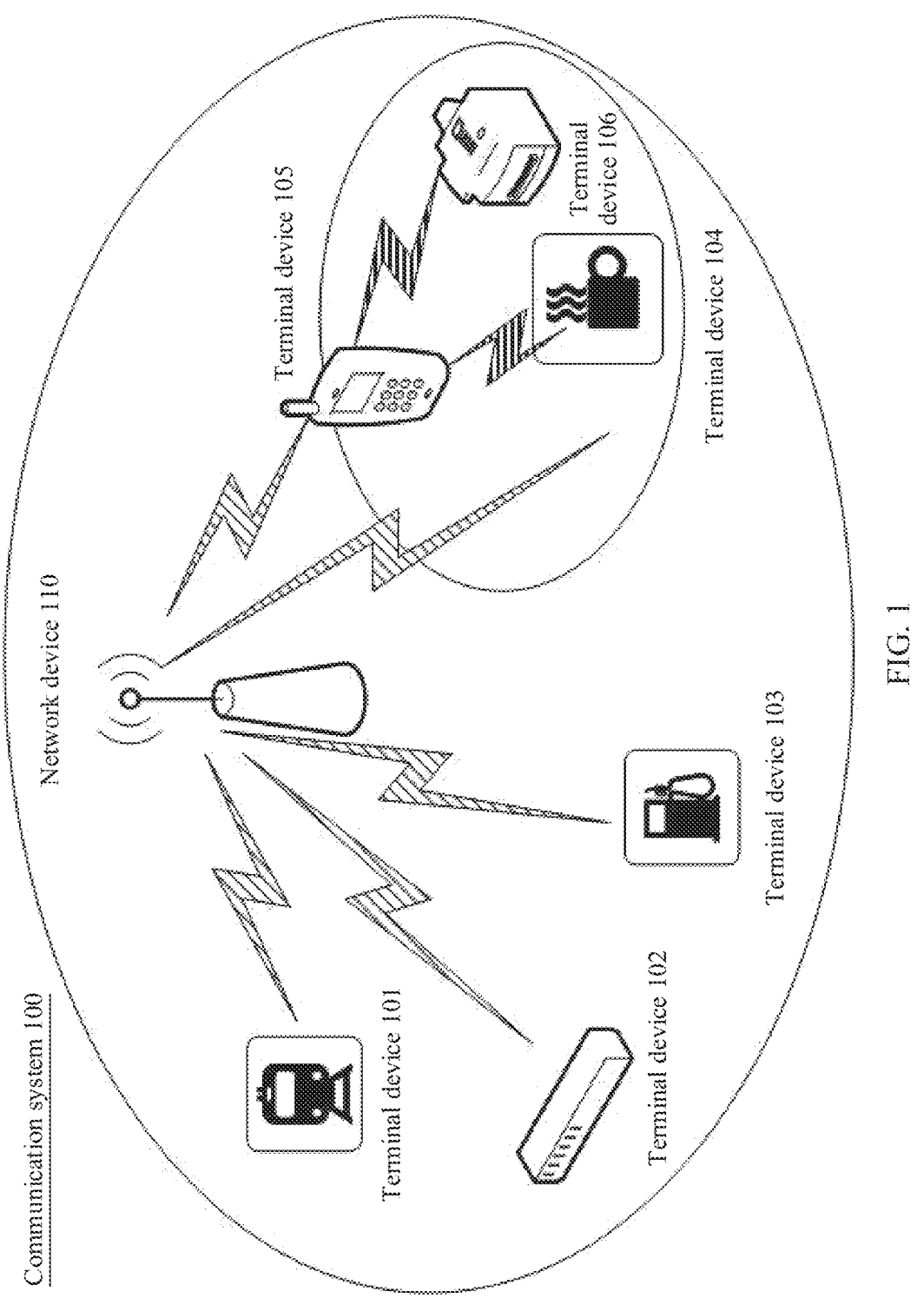
FIG. 1 is a schematic diagram of an architecture of a communication system according to an embodiment of this application.

FIG. 1 is a schematic diagram of an architecture of a communication system 100 according to an embodiment of this application. The communication system 100 may include a network device 110 and a terminal device 101 to a terminal device 106. It should be understood that the communication system 100 to which the method in the embodiments of this application is applicable may include more or fewer network devices or terminal devices. The network device or the terminal device may be hardware, may be software obtained through functional division, or may be a combination thereof. The network device and the terminal device may communicate with each other through another device or network element. In the communication system 100, the network device 110 may send downlink data to the terminal device 101 to the terminal device 106. Certainly, the terminal device 101 to the terminal device 106 may alternatively send uplink data to the network device 110. The terminal device 101 to the terminal device 106 may be a cellular phone, a smartphone, a portable computer, a handheld communication device, a handheld computing device, a satellite radio apparatus, a global positioning system, a personal digital assistant (personal digital assistant, PDA), and/or any other suitable device configured to perform communication in the wireless communication system 100. The network device 110 may be an access point (access point, AP), a NodeB, an evolved NodeB (environment bureau, eNB), or a 5G base station (next generation base station, gNB), and is a device, in an access network, that communicates with a wireless terminal over an air interface by using one or more sectors. The communication system 100 may use a public land mobile network (public land mobile network, PLMN), a device-to-device (device-to-device, D2D) network, a machine to machine (machine to machine, M2M) network, an internet of things (internet of things, IoT), or another network. In addition, the terminal device 104 to the terminal device 106 may alternatively form a communication system. In this communication system, the terminal device 105 may send downlink data to the terminal device 104 or the terminal device 106. The method in embodiments of this application may be applied to the communication system 100 shown in FIG. 1.

An mmWave has a short wavelength, a high frequency, and strong attenuation, and is susceptible to rain fade and atmospheric absorption. Therefore, mobility and coverage bring a great challenge. To better obtain a transmit gain and a receive gain, the mmWave uses a narrow beam for transmission and reception. This improves coverage and mobility. Moreover, such a beam can obtain an optimal gain only when it is ensured that main lobe directions of a receive beam and a transmit beam are aligned. FIG. 2 is a schematic diagram of beam alignment according to an embodiment of this application. If a beam pair on the left is selected, the main lobe directions are not aligned. Consequently, receive and transmit performance is affected. If a beam pair on the right is selected, the main lobe directions can be aligned. Therefore, an optimal receive gain and an optimal transmit gain can be obtained.

Because a quantity of antenna elements of a base station is relatively large, and an antenna area is relatively large, a transmit gain and a receive gain of beams in various directions can be relatively balanced. However, a quantity of antenna elements of UE is relatively small, and an antenna panel is relatively small. Consequently, beams in various directions cannot be balanced. For example, FIG. 3(A) and FIG. 3(B) are top views and side views of a 5*5 antenna array factor gain according to an embodiment of this application. There are five sectors in each direction, 25 sectors in total. It can be learned from FIG. 3(A) and FIG. 3(B) that effective isotropic radiated power (effective isotropic radiated power, EIRP) performance in a direction of a peak direction beam (that is, a beam perpendicular to an antenna panel) is optimal, and the EIRP of beams around the peak direction beam is decreasing. It can also be learned from FIG. 3(C) that the EIRP of the peak direction beam in the middle and beam components around the peak direction beam is decreasing.

In a current technical solution, for one transmit beam, all receive beams may be measured and scanned once, and the foregoing process is repeated. For each of other transmit beams, all receive beams are measured and scanned once, and a beam pair of a receive beam and a transmit beam with optimal measurement values is used as an optimal beam pair. However, this solution cannot ensure that the optimal receive beam and the optimal transmit beam of the UE are used each time to form an optimal beam pair.

FIG. 4 is a schematic flowchart of a beam alignment method according to an embodiment of this application. This embodiment of this application includes at least the following steps.

S401: Receive, at a current location by using a plurality of receive beams, a transmit beam sent by a network device, and determine reference signal received power (reference signal receiving power, RSRP) of each of the plurality of receive beams.

Specifically, for each transmit beam of the network device, all receive beams are measured and scanned at the current location, and the RSRP of each receive beam is determined.

S402: Select an optimal receive beam from the plurality of receive beams based on the RSRP.

Specifically, a receive beam with highest RSRP may be selected from the plurality of receive beams as the optimal receive beam. In this case, a terminal device forms an optimal beam pair by using the receive beam with the highest RSRP and the transmit beam of the network device.

S403: Determine, based on the optimal receive beam, a rotation angle and a rotation direction that are required by the terminal device to align a peak direction beam with the transmit beam.

Specifically, the terminal device may determine a relative location of the peak direction beam and the optimal receive beam, and determine, based on the relative location, the rotation angle and the rotation direction that are required by the terminal device to align the peak direction beam with the transmit beam, that is, the rotation angle and the rotation direction that are required for rotating from a location of the peak direction beam to a location of the optimal receive beam. The peak direction beam is a beam perpendicular to an antenna panel of the network device.

S404: Adjust a location of the terminal device based on the rotation angle and the rotation direction, and form an optimal beam pair by using the peak direction beam and the transmit beam at an adjusted location.

Specifically, a direction and an angle of the terminal device may be adjusted based on the rotation direction and the rotation angle, to adjust a radiation direction and a radiation angle of an antenna in the terminal device. Rotation of the terminal device is stopped when the terminal device is adjusted to a location indicated by the rotation angle and the rotation direction. In this case, the terminal device may align the peak direction beam with the transmit beam to form the optimal beam pair.

Optionally the terminal device may display the rotation angle and the rotation direction. In this way, a user may rotate the terminal device based on the displayed rotation angle and rotation direction. For example, the rotation angle and the rotation direction may be displayed in a notification bar of the terminal device, or the rotation angle and the rotation direction may be displayed in the middle of a display interface of the terminal device. Alternatively, the rotation angle and the rotation direction may be displayed by using a prompt box (for example, a popover). It should be noted that the rotation angle and the rotation direction may alternatively be displayed in another manner, and the display manner is not limited herein.

Figure 5:
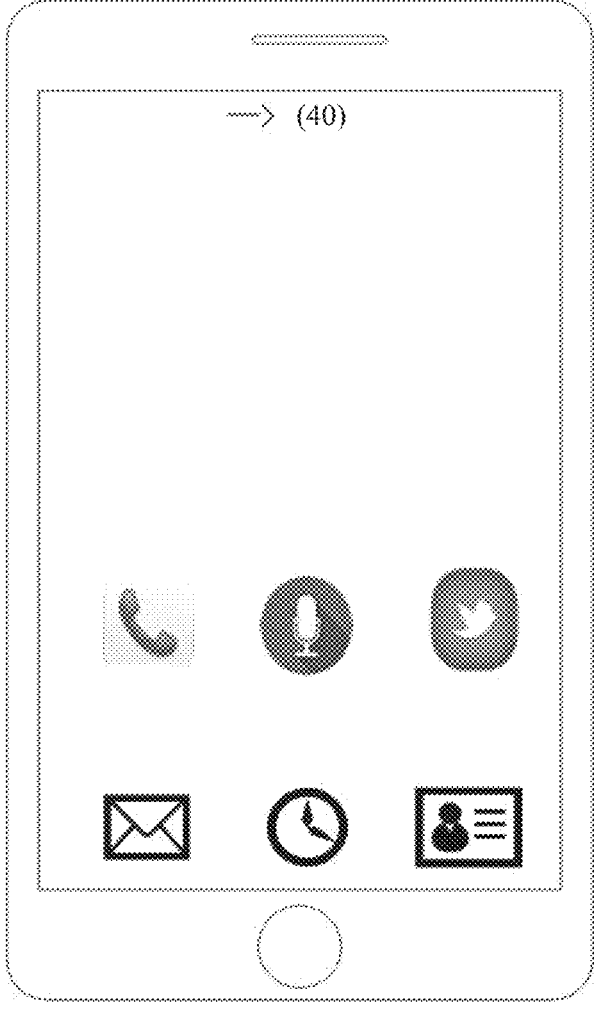
FIG. 5 is a schematic diagram of information display according to an embodiment of this application.

For example, FIG. 5 is a schematic diagram of information display according to an embodiment of this application. "→(40)" is displayed in the notification bar of the terminal device, indicating to rotate the terminal device rightward by 40 degrees, so that the terminal device can form the optimal beam pair by using the peak direction beam and the transmit beam. It should be noted that the terminal device may alternatively be rotated in any direction, such as a left direction, a forward direction, or a right direction, and the rotation angle may alternatively be any angle.

Optionally, when duration for displaying the rotation angle and the rotation direction exceeds a preset threshold, displaying of the rotation angle and the rotation direction may be stopped. The preset threshold may be 30 seconds or 1 minute. This is not limited herein.

Optionally when the terminal device is adjusted to the location indicated by the rotation angle and the rotation direction, the terminal device displays prompt information. The prompt information is used to prompt the user that adjustment of the location of the terminal device is completed. In this case, when viewing the prompt information, the user may stop rotating the location of the terminal device, so that the terminal device can form the optimal beam pair by using the peak direction beam and the transmit beam.

Figure 6:
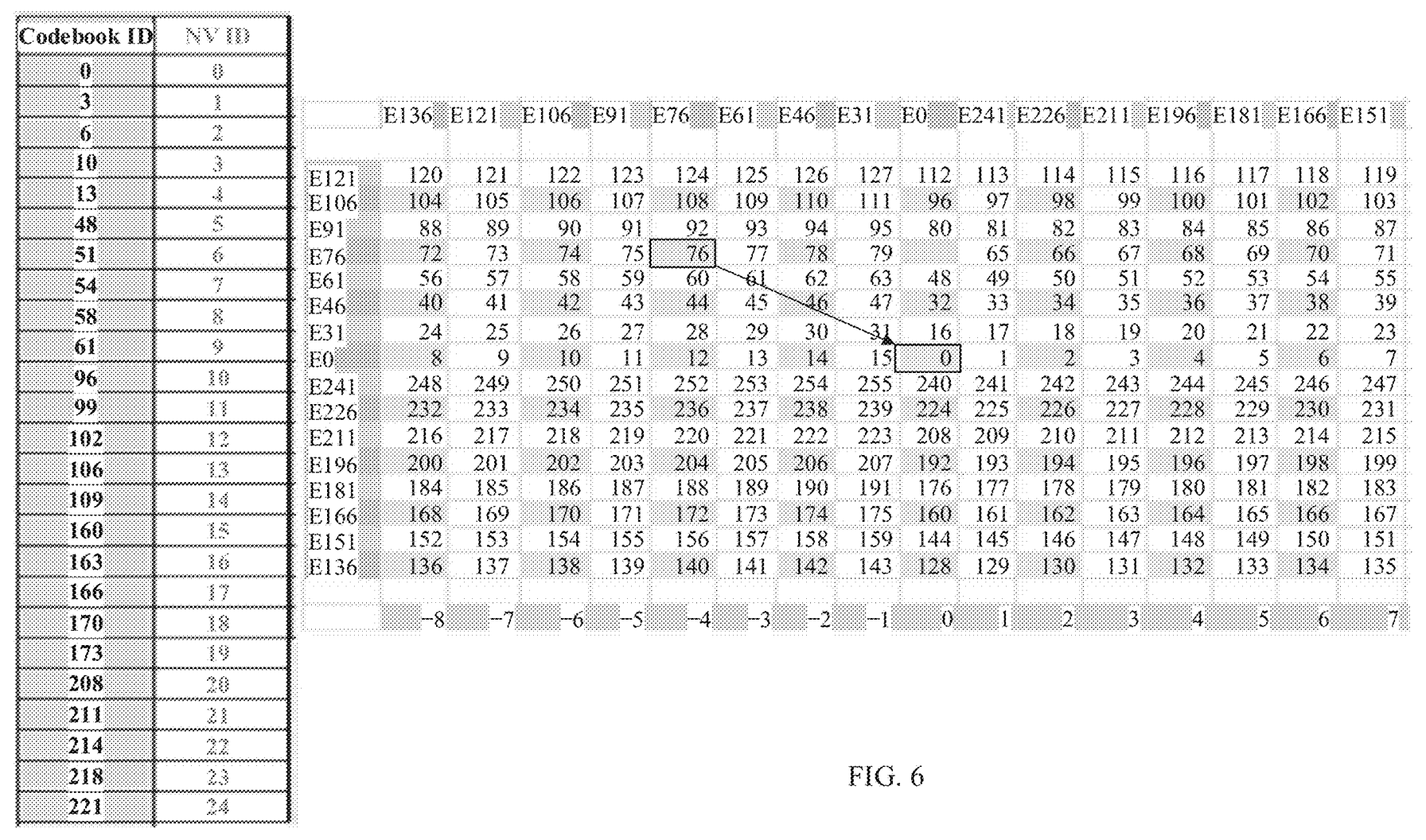

For example, FIG. 6 is a schematic diagram of a beam according to an embodiment of this application. A left side of FIG. 6 represents an ID of a receive beam that can be used by the terminal device. A beam 0 is a peak direction beam (bore sight direction/peak direction), and a beam 76 used at the current location and a transmit beam of a base station are used to form an optimal beam pair. Therefore, a corresponding angle between the two beams (the beam 76 and the beam 0) may be rotated, to rotate the beam 0 to a location of the beam 76, so that UE uses the beam 0) and the transmit beam of the base station to form the optimal beam pair. A rotation angle by which the beam 0 is rotated to the beam 76 is an angle by which the UE needs to be rotated.

In this embodiment of this application, the transmit beam sent by the network device is received at the current location by using the plurality of receive beams, and the optimal receive beam is selected from the plurality of receive beams based on the RSRP of each receive beam. The rotation angle and the rotation direction that are required by the terminal device to align the peak direction beam with the transmit beam are determined based on the optimal receive beam. The location of the terminal device is adjusted based on the rotation angle and the rotation direction, and the peak direction beam and the transmit beam are used to form the optimal beam pair at the adjusted location. The rotation angle and the rotation direction that are required for rotating from the location of the peak direction beam to the location of the optimal receive beam are determined, so that after adjusting the location, the terminal device can form the optimal beam pair by using the peak direction beam and the transmit beam. This not only increases a transmit gain or a receive gain of the terminal device, but also improves coverage and mobility of a millimeter wave.

The method in embodiments of this application is described above in detail, and an apparatus in embodiments of this application is provided below.

Figure 7:
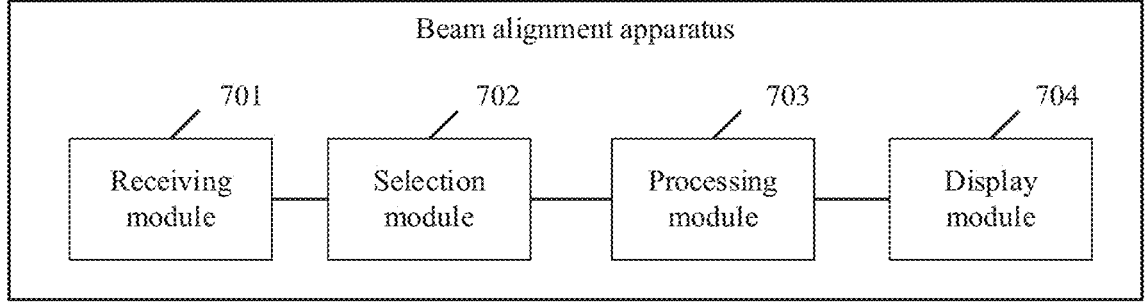
FIG. 7 is a schematic diagram of a structure of a beam alignment apparatus according to an embodiment of this application.

FIG. 7 is a schematic diagram of a structure of a beam alignment apparatus according to an embodiment of this application. The beam alignment apparatus may include a receiving module 701, a selection module 702, a processing module 703, and a display module 704. Detailed descriptions of the modules are as follows:

The receiving module 701 is configured to: receive, at a current location by using a plurality of receive beams, a transmit beam sent by a network device, and determining reference signal received power RSRP of each of the plurality of receive beams.

The selection module 702 is further configured to select an optimal receive beam from the plurality of receive beams based on the RSRP.

The processing module 703 is further configured to determine, based on the optimal receive beam, a rotation angle and a rotation direction that are required by a terminal device to align a peak direction beam with the transmit beam.

The processing module 703 is configured to: adjust a location of the terminal device based on the rotation angle and the rotation direction, and form an optimal beam pair by using the peak direction beam and the transmit beam at an adjusted location.

Optionally, the display module 704 is configured to display the rotation angle and the rotation direction.

Optionally, the display module 704 is configured to: display prompt information when the terminal device is adjusted to a location indicated by the rotation angle and the rotation direction. The prompt information is used to prompt a user that adjustment of the location of the terminal device is completed.

Optionally, the selection module 702 is further configured to select, from the plurality of receive beams, a receive beam with highest RSRP as the optimal receive beam.

Optionally, the processing module 703 is further configured to: determine a relative location of the peak direction beam and the optimal receive beam, and determine, based on the relative location, the rotation angle and the rotation direction that are required by the terminal device to align the peak direction beam with the transmit beam.

Optionally, the peak direction beam is a beam perpendicular to an antenna panel of the network device.

It should be noted that, for implementation of each module, refer to the corresponding description in the method embodiment shown in FIG. 4, to perform the method and the function performed by the terminal device in the foregoing embodiment.

An embodiment of this application provides a terminal device. The terminal device includes a modem, a processor, and a display. The modem is configured to perform the method and the function performed by the receiving module 701 and the selection module 702. The processor is configured to perform the method and the function performed by the processing module 703. The display is configured to perform the method and the function performed by the display module 704.

Figure 8:
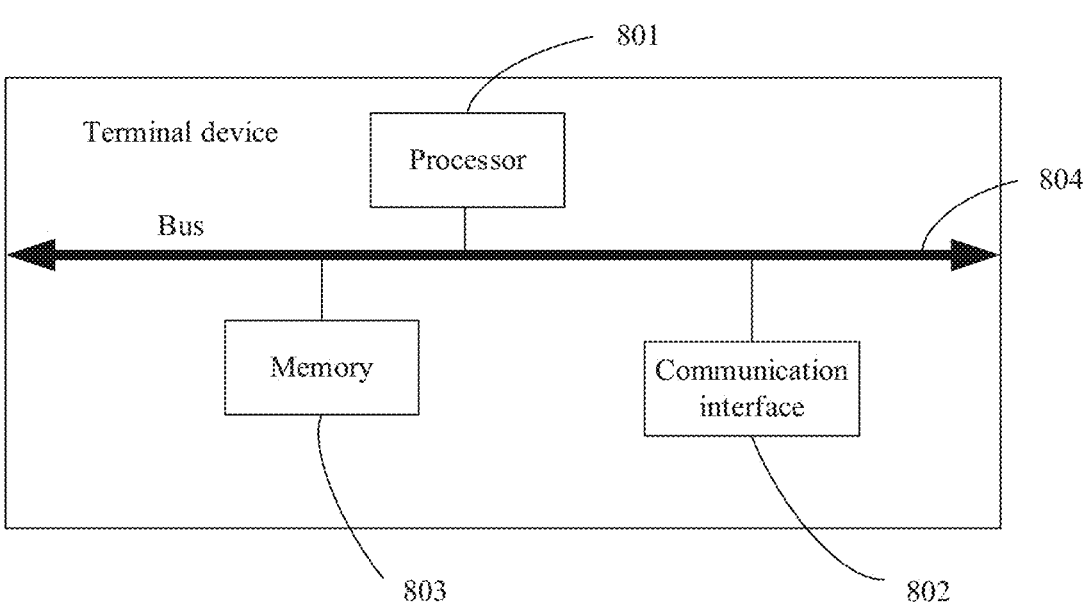
FIG. 8 is a schematic diagram of a structure of a terminal device according to an embodiment of this application.

FIG. 8 is a schematic diagram of a structure of a terminal device according to an embodiment of this application. As shown in FIG. 8, the terminal device may include at least one processor 801, at least one communication interface 802, at least one memory 803, and at least one communication bus 804.

The processor 801 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication bus 804 may be a peripheral component interconnect PCI bus, an extended industry standard architecture EISA bus, or the like. The bus may be classified into an address bus, a data bus, a control bus, and the like. For ease of representation, only one thick line is for representing the bus in FIG. 8, but this does not mean that there is only one bus or only one type of bus. The communication bus 804 is configured to implement communication connection between these components. The communication interface 802 of the device in this embodiment of this application is configured to perform signaling or data communication with another node device. The memory 803 may include a volatile memory, for example, a nonvolatile dynamic random access memory (nonvolatile random access memory, NVRAM), a phase-change random access memory (phase-change RAM, PRAM), or a magnetoresistive random access memory (magnetoresistive RAM. MRAM); or may include a nonvolatile memory, for example, at least one magnetic disk storage device, an electrically erasable programmable read-only memory (electrically erasable programmable read-only memory. EEPROM), a flash memory device such as a NOR flash memory (NOR flash memory) or a NAND flash memory (NAND flash memory), or a semiconductor device such as a solid-state drive (solid-state drive, SSD). Optionally, the memory 803 may alternatively be at least one storage apparatus that is away from the processor 801. Optionally, the memory 803 may further store a group of program code. Optionally, the processor 801 may further execute a program stored in the memory 803.

The processor 801 is configured to perform the following operation steps:

receiving, at a current location by using a plurality of receive beams, a transmit beam sent by a network device, and determine reference signal received power RSRP of each of the plurality of receive beams;

selecting an optimal receive beam from the plurality of receive beams based on the RSRP;

determining, based on the optimal receive beam, a rotation angle and a rotation direction that are required by a terminal device to align a peak direction beam with the transmit beam; and adjusting a location of the terminal device based on the rotation angle and the rotation direction, and form an optimal beam pair by using the peak direction beam and the transmit beam at an adjusted location.

Optionally, the processor 801 is further configured to perform the following operation step:

displaying the rotation angle and the rotation direction.

Optionally, the processor 801 is further configured to perform the following operation step:

displaying prompt information when the terminal device is adjusted to a location indicated by the rotation angle and the rotation direction, where the prompt information is used to prompt a user that adjustment of the location of the terminal device is completed.

Optionally, the processor 801 is further configured to perform the following operation step:

selecting, from the plurality of receive beams, a receive beam with highest RSRP as the optimal receive beam.

Optionally, the processor 801 is further configured to perform the following operation steps:

determining a relative location of the peak direction beam and the optimal receive beam; and determining, based on the relative location, the rotation angle and the rotation direction that are required by the terminal device to align the peak direction beam with the transmit beam.

Optionally, the peak direction beam is a beam perpendicular to an antenna panel of the network device.

Further, the processor may cooperate with the memory and the communication interface to perform the operations of the terminal device in the foregoing embodiments of this application.

An embodiment of this application further provides a chip system. The chip system includes a processor, and is configured to support a terminal device in implementing the function in any one of the foregoing embodiments, for example, calculating a rotation angle and a rotation direction, and receiving or sending the rotation angle and the rotation direction. In a possible design, the chip system may further include a memory, and the memory is configured to store program instructions and data that are necessary for the terminal device or a network device. The chip system may include a chip, or may include a chip and another discrete component.

An embodiment of this application further provides a processor, configured to be coupled to a memory, and configured to perform any method and function that are related to the terminal device in any one of the foregoing embodiments.

An embodiment of this application further provides a computer program product including instructions. When the computer program product runs on a computer, the computer is enabled to perform any method and function that are related to the terminal device in any one of the foregoing embodiments.

An embodiment of this application further provides an apparatus. The apparatus is configured to perform any method and function that are related to the terminal device in any one of the foregoing embodiments.

An embodiment of this application further provides a wireless communication system. The system includes at least one terminal device and at least one network device that are involved in any one of the foregoing embodiments.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a network device, computer, server, or data center to another network device, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A beam alignment method, comprising:

receiving, by a terminal device at a current location by using a plurality of receive beams, a network transmit beam transmitted from a network device;

determining reference signal received powers (RSRPs) of the plurality of receive beams;

selecting an optimal receive beam from the plurality of receive beams based on the RSRPs;

determining, based on the optimal receive beam, a rotation angle and a rotation direction for the terminal device to align a peak direction beam with the network transmit beam;

adjusting a direction and an angle of the terminal device based on the rotation angle and the rotation direction to obtain an adjusted radiation direction and an adjusted radiation angle of an antenna in the terminal device; and forming an optimal beam pair using the peak direction beam and the network transmit beam at the adjusted radiation direction and the adjusted radiation angle.

2. The beam alignment method of claim 1, further comprising displaying the rotation angle and the rotation direction.

3. The beam alignment method of claim 1, further comprising displaying prompt information when adjusting the direction and the angle, wherein the prompt information prompts a user to adjust the direction and the angle of the terminal device.

4. The beam alignment method of claim 1, wherein selecting the optimal receive beam from the plurality of receive beams based on the RSRP comprises selecting, from the plurality of receive beams, a receive beam with a highest RSRP as the optimal receive beam.

5. The beam alignment method of claim 1, wherein determining the rotation angle and the rotation direction for the terminal device to align the peak direction beam with the network transmit beam comprises:

determining a relative location of the peak direction beam and the optimal receive beam; and determining, based on the relative location, the rotation angle and the rotation direction for the terminal device to align the peak direction beam with the network transmit beam.

6. The beam alignment method of claim 1, wherein the peak direction beam is perpendicular to an antenna panel of the network device.

7. A beam alignment apparatus of a terminal device, comprising:

a receiver configured to:

receive, at a current location by using a plurality of receive beams, a network transmit beam transmitted from a network device; and determine reference signal received powers (RSRPs) of the plurality of receive beams;

a selector configured to select an optimal receive beam from the plurality of receive beams based on the RSRPs; and a processor coupled to the receiver and the selector, wherein the processor is configured to:

determine, based on the optimal receive beam, a rotation angle and a rotation direction for the terminal device to align a peak direction beam with the network transmit beam;

adjust a direction and an angle of the terminal device based on the rotation angle and the rotation direction to obtain an adjusted radiation direction and an adjusted radiation angle of an antenna in the terminal device; and form an optimal beam pair using the peak direction beam and the network transmit beam at the adjusted radiation direction and the adjusted radiation angle.

8. The beam alignment apparatus of claim 7, further comprising a display configured to display the rotation angle and the rotation direction.

9. The beam alignment apparatus of claim 8, wherein the display is further configured to display prompt information when adjusting the direction and the angle, and wherein the prompt information is configured to prompt a user to adjust of the direction and the angle of the terminal device.

10. The beam alignment apparatus of claim 7, wherein the selector is further configured to select, from the plurality of receive beams, a receive beam with a highest RSRP as the optimal receive beam.

11. The beam alignment apparatus of claim 7, wherein the processor is further configured to:

determine a relative location of the peak direction beam and the optimal receive beam; and determine, based on the relative location, the rotation angle and the rotation direction for the terminal device to align the peak direction beam with the network transmit beam.

12. The beam alignment apparatus of claim 7, wherein the peak direction beam is a beam perpendicular to an antenna panel of the network device.

13. A terminal device comprising:

an antenna;

a modem coupled to the antenna and configured to:

receive, at a current location by using a plurality of receive beams, a network transmit beam transmitted from a network device;

determine reference signal received powers (RSRPs) of the plurality of receive beams; and select an optimal receive beam from the plurality of receive beams based on the RSRP; and a processor coupled to the modem and configured to:

receive the optimal receive beam from the modem;

determine a rotation angle and a rotation direction for the terminal device to align a peak direction beam with the network transmit beam;

adjust a direction and an angle of the terminal device based on the rotation angle and the rotation direction to obtain an adjusted radiation direction and an adjusted radiation angle of the antenna; and form an optimal beam pair by using the peak direction beam and the network transmit beam at the adjusted radiation direction and the adjusted radiation angle.

14. The terminal device of claim 13, wherein the terminal device further comprises a display coupled to the processor and configured to display the rotation angle and the rotation direction.

15. The terminal device of claim 14, wherein the display is further configured to display prompt information when adjusting the direction and the angle, and wherein the prompt information is configured to prompt a user to adjust the direction and the angle of the terminal device.

16. The terminal device of claim 13, wherein the modem is further configured to select, from the plurality of receive beams, a receive beam with a highest RSRP as the optimal receive beam.

17. The terminal device of claim 13, wherein the processor is further configured to:

determine a relative location of the peak direction beam and the optimal receive beam; and determine, based on the relative location, the rotation angle and the rotation direction for the terminal device to align the peak direction beam with the network transmit beam.

18. The terminal device of claim 13, wherein the peak direction beam is a beam perpendicular to an antenna panel of the network device.

19. The terminal device of claim 13, wherein the rotation angle and the rotation direction for the terminal device to align the peak direction beam with the network transmit beam comprises a main lobe direction of the optimal receive beam aligned with the main lobe direction of the network transmit beam.

20. The beam alignment apparatus of claim 7, wherein the rotation angle and the rotation direction for the terminal device to align the peak direction beam with the network transmit beam comprises a main lobe direction of the optimal receive beam aligned with the main lobe direction of the network transmit beam.

* * * * *